US008413573B2

(12) United States Patent
Rebecchi

(10) Patent No.: US 8,413,573 B2
(45) **Date of Patent: *Apr. 9, 2013**

(54) HELICAL SPLINE ACTUATORS

(75) Inventor: Francesco Rebecchi, Castellanza (IT)

(73) Assignee: PetrolValves LLC, Houston, TX (US)

( * ) Notice: Subject to any disclaimer, the term of this patent is extended or adjusted under 35 U.S.C. 154(b) by 803 days.

This patent is subject to a terminal disclaimer.

(21) Appl. No.: 12/542,530

(22) Filed: Aug. 17, 2009

(65) Prior Publication Data

US 2009/0302255 A1 Dec. 10, 2009

Related U.S. Application Data

(62) Division of application No. 12/121,295, filed on May 15, 2008, now Pat. No. 7,584, 692.

(60) Provisional application No. 60/938,948, filed on May 18, 2007, provisional application No. 60/951,749, filed on Jul. 25, 2007.

(51) Int. Cl.
*F16K 51/00* (2006.01)

(52) U.S. Cl. ............. 92/31; 92/129; 251/63.4; 251/229; 251/249.5; 251/315.01

(58) Field of Classification Search .................. 251/229, 251/248, 249.5, 250.5, 315.01, 315.1, 63.4; 74/425, 724; 92/31, 129
See application file for complete search history.

(56) References Cited

U.S. PATENT DOCUMENTS 2,222,699 A * 11/1940 Ball ........................... 251/249.5
3,505,888 A * 4/1970 Denkowski .............. 251/129.11
3,602,478 A 8/1971 Cairns et al.
3,889,924 A * 6/1975 Karpenko .................. 251/249.5
4,008,887 A 2/1977 Yasuoka et al.
4,085,770 A * 4/1978 Woronowicz ............ 251/315.09
4,316,596 A 2/1982 Krober et al.
4,346,728 A * 8/1982 Sulzer ...................... 251/129.12
4,545,289 A * 10/1985 Weyer ........................... 251/288
4,585,207 A 4/1986 Shelton
4,603,616 A 8/1986 Zajac (Continued)

FOREIGN PATENT DOCUMENTS

DE 29716199 U1 11/1997

OTHER PUBLICATIONS

International Preliminary Report on Patentability for International Patent Application Serial No. PCT/US2008/063749, mailed Dec. 3, 2009.

*Primary Examiner* — John Bastianelli
(74) *Attorney, Agent, or Firm* — Corridor Law Group, P.C.

(57) ABSTRACT

Helical spline actuators can be employed to actuate ball valves. In certain embodiments, an actuator can include a remote operated vehicle shaft, an internally splined shaft, and an externally splined shaft that can be used in combination to actuate a ball valve. In certain embodiments, an actuator can include a piston that is displaced axially and not rotated, an externally splined shaft, and an internally splined shaft that can be used in combination to actuate a ball valve. In certain embodiments, an actuator can include a piston, a spring, a spring cap, and a joint member wherein the spring cap and joint member translate axial force from the spring to the piston. In certain embodiments, an actuator can include a bearing that insulates a piston from rotational forces exerted by an externally splined shaft.

4 Claims, 4 Drawing Sheets

U.S. PATENT DOCUMENTS

| | | | | |
|---|---|---|---|---|
| 4,744,386 | A | | 5/1988 | Frazer |
| 4,882,979 | A | | 11/1989 | Weyer |
| 5,099,805 | A | | 3/1992 | Ingalls |
| 5,168,896 | A | | 12/1992 | Boesch et al. |
| 5,170,693 | A | | 12/1992 | Stary |
| 5,224,512 | A | * | 7/1993 | Nogami et al. ............ 251/249.5 |
| 5,326,073 | A | | 7/1994 | Beyer et al. |
| 6,079,442 | A | * | 6/2000 | Raymond et al. ............. 251/248 |

* cited by examiner

HELICAL SPLINE ACTUATORS

CROSS-REFERENCE TO RELATED APPLICATION(S)

This application is a divisional of U.S. patent application Ser. No. 12/121,295 filed May 15, 2008, now U.S. Pat. No. 7,584,692 entitled "Helical Spline Actuators". The '295 application, in turn, claimed priority benefits from U.S. Provisional Application Nos. 60/938,948 filed May 18, 2007, entitled "Helical Spline Actuators," and 60/951,749 filed Jul. 25, 2007, also entitled "Helical Spline Actuators". Each of the '295 non-provisional and the '948 and '749 provisional applications is hereby incorporated by reference herein in its entirety.

FIELD OF THE INVENTION

The present invention relates to helical spline actuators and, in particular, those employed to actuate ball valves.

BACKGROUND OF THE INVENTION

Helical spline actuators can transform axial force into rotational torque. Helical spline actuators utilize a combination of shafts, a male shaft that is externally splined and a female shaft that is internally splined. In certain applications, a male shaft can be displaced axially through a female shaft such that the splines engage and the male shaft rotates. Similarly, in certain applications, a female shaft can be rotated in order to cause axial displacement of the male shaft.

Helical spline actuators have been used to actuate ball valves. In certain applications, the output shaft of the actuator can be connected to the valve stem of a ball valve, so that the valve can be moved from a closed position to an open position and vice versa using the actuator. In certain applications, operating torque is generated in the actuator using pressurized fluid (for example, hydraulic fluid) and/or, in the case of single acting spring return actuators, a spring. In certain applications, underwater actuators can also include a gearbox for operation of the valve locally by applying torque to an interface located on the external boundary of the actuator.

Known helical spline actuators suffer from contamination and a relatively short lifespan. There is therefore a need for helical spline actuators that provide reduced contamination and extended lifespan. Further, it is desirable to reduce the size and weight of actuators in order to reduce the space they require and to reduce costs associated with making and using the actuators.

SUMMARY OF THE INVENTION

Certain embodiments of the present technology provide an actuator that includes: (a) a piston at least partially disposed within a cavity, said piston displaceable axially and rotationally inhibited; (b) a first feed conduit for directing a fluid to a first end of said cavity, said fluid capable of exerting force on said piston in a first axial direction, thereby displacing said piston in said first axial direction; (c) a first shaft having helical spline teeth extending from an exterior surface thereof, said first shaft displaceable in said first axial direction when said piston is displaced in said first axial direction; and (d) a second tubular shaft having helical spline teeth extending from an interior surface thereof, said second shaft interiorly-extending helical spline teeth engageable with said first shaft externally-extending helical spline teeth, whereby upon displacement of said first shaft in said first axial direction, said first shaft is urged to rotate in a first rotational direction. In certain embodiments, for example, said first shaft has valve stem of a ball valve operatively associated therewith, whereby rotation of said first shaft correspondingly rotates said valve stem, thereby actuating said ball valve.

In certain embodiments, for example, an actuator also includes: (e) a spring capable of exerting force on said piston in a second axial direction axially opposed to said first axial direction, whereby said piston is displaceable in said second axial direction in the absence of force exerted by said fluid on said piston in said first axial direction, wherein displacement of said piston in said second axial direction urges said first shaft to be displaced in said second axial direction, whereby upon displacement of said first shaft in said second axial direction, said first shaft is urged to rotate in a second rotational direction circumferentially opposed to said first rotational direction. In certain embodiments, for example, an actuator also includes: (f) a spring cap engaging said spring; and (g) a joint member engaging each of said spring cap and said piston, whereby upon exertion of force by said spring on said spring cap in said second axial direction, said spring cap translates said force to said joint member, and said joint member translates said force to said piston, thereby displacing said piston in said second axial direction.

In certain embodiments, for example, an actuator also includes: (e) a bearing interposed between said piston and said first shaft such that translation of rotational force exerted by said first shaft to said piston is impeded.

In certain embodiments, for example, an actuator also includes: (e) a second feed conduit for directing a fluid to a second end of said cavity, said fluid capable of exerting force on said piston in a second axial direction axially opposite said first axial direction, thereby displacing said piston in said second axial direction, whereby upon displacement of said first shaft in said second axial direction, said first shaft is urged to rotate in a second rotational direction that is opposite of said first rotational direction when said first shaft is displaced in said second axial direction circumferentially opposed to said first rotational direction.

Certain embodiments of the present technology provide an actuator that includes: (a) a first shaft having helical spline teeth extending from an external surface thereof; (b) a second tubular shaft having helical spline teeth extending from an interior surface thereof, said second shaft interiorly-extending helical spline teeth engageable with said first shaft exteriorly-extending helical spline teeth, whereby upon rotation of said second shaft in a first rotational direction, said first shaft is displaced in a first axial direction, and wherein upon rotation of said second shaft in a second rotational direction circumferentially opposed to said first rotational direction, said first shaft is displaced in a second axial direction axially opposed to said first axial direction; and (c) a third shaft extending from a remotely operated vehicle, said third shaft engageable with said second shaft such that upon rotation of said third shaft in a third rotational direction, said second shaft rotates in said first rotational direction, and wherein upon rotation of said third shaft in a fourth rotational direction circumferentially opposed to said third rotational direction, said second shaft rotates in said second rotational direction. In certain embodiments, for example, said first shaft has valve stem of a ball valve operatively associated therewith, whereby rotation of said first shaft correspondingly rotates said valve stem, thereby actuating said ball valve.

BRIEF DESCRIPTION OF THE DRAWING(S)

Figure 1:
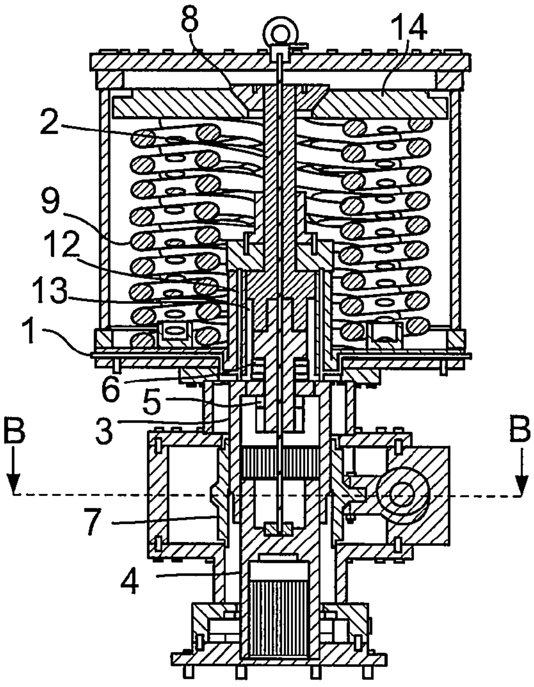
FIG. 1 is a side sectional view of a helical spline actuator used in accordance with an embodiment of the present technology.

The foregoing summary, as well as the following detailed description of embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF PREFERRED EMBODIMENT(S)

Below is a detailed description of embodiments depicted in FIGS. 1-8. In the figures, like elements are identified with like numbers.

Figure 2:
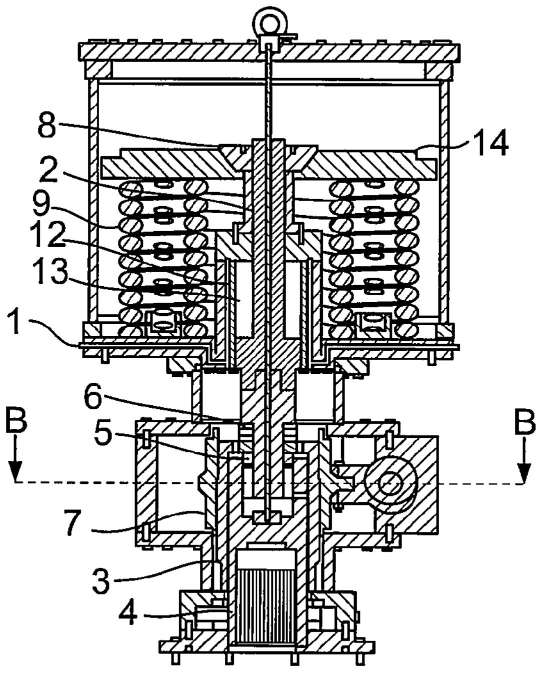
FIG. 2 is a side sectional view of the actuator of FIG. 1.
Figure 3:
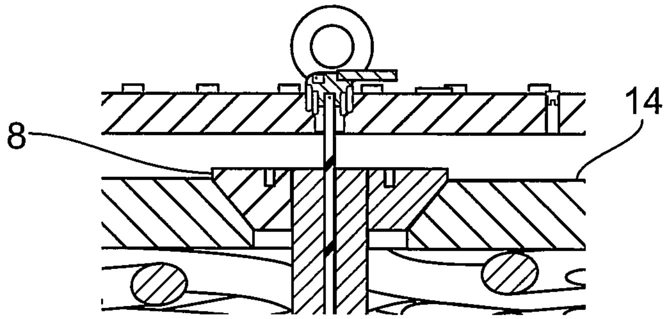
FIG. 3 is a side sectional view of a portion of the actuator of FIG. 1.
Figure 4:
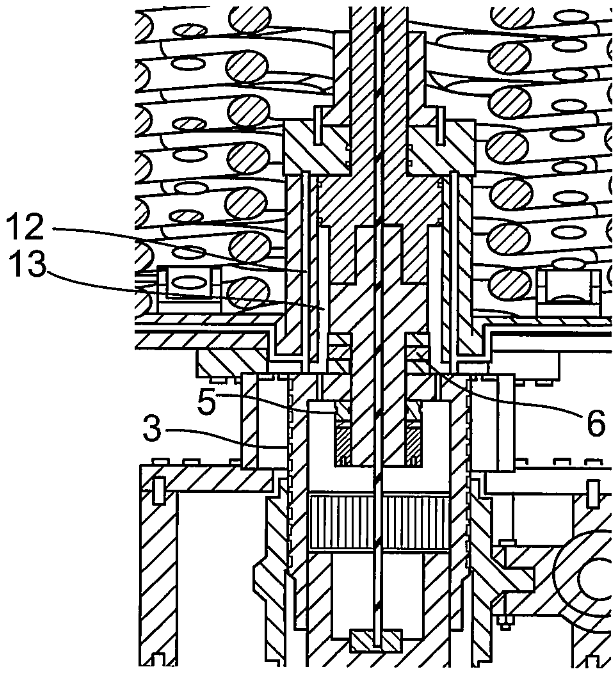
FIG. 4 is a side sectional view of a portion of the actuator of FIG. 1.

FIG. 1 is a side sectional view of a helical spline actuator used in accordance with an embodiment of the present technology. FIG. 2 is a side sectional view of the actuator of FIG. 1. FIG. 3 is a side sectional view of a portion of the actuator of FIG. 1. FIG. 4 is a side sectional view of a portion of the actuator of FIG. 1.

In the embodiment shown in FIGS. 1-4, the helical spline actuator includes a fluid port 1, a piston 2, an externally splined shaft 3, a spline shaft 4, bearings 5, 6, an internally splined shaft 7, a joint member 8, springs 9, a feed line 12, a cavity 13, and a spring cap 14. Applying pressure to fluid port 1 supplies fluid, for example, hydraulic fluid, to the cavity 13 via the feed line 12. The fluid exerts an axial force on the piston 2, which is displaced downwards, thereby compressing the springs 9 and forcing the externally splined shaft 3 to be displaced in the direction that the axial pressure is applied. The spline teeth of the externally splined shaft 3 engage the spline teeth of the internally splined shaft 7, thereby forcing the externally splined shaft 3 to rotate. The internally splined shaft 7 does not rotate during this operation and is held in place by a worm screw. The rotation and displacement of the externally splined shaft 3 cause the spline shaft 4, which is attached to the valve stem of the ball valve, to rotate, thereby causing the valve stem to rotate. Rotation of the valve stem causes the ball valve to move from a closed position to an open position. In certain embodiments, a valve stem can be rotated a quarter turn in order to move from a closed position to an open position. FIG. 2 depicts the piston 2 in the position it will be in after the cavity 13 is filled with pressurized fluid, for example, after a complete hydraulic stroke.

As shown in FIG. 2, the springs 9 are compressed when the cavity 13 is filled with pressurized fluid. The springs 9 exert an axial force in the direction opposite the axial force exerted by the fluid. That is, the springs 9 exert a force on the spring cap 14 which translates the force to the joint member 8 (the joint member can be spherical in certain embodiments) which translates the force to the piston 2. However, when pressure to the fluid port 1 is relieved, the spring force is greater than that applied by the non-pressurized fluid. When this is the case, the piston 2 moves upward in the direction of the force applied by the springs 9, thereby forcing the fluid to be emptied from the cavity 13 via the feed line 12, and forcing the externally splined shaft 3 to be displaced in the direction that the axial spring pressure is applied. The spline teeth of the externally splined shaft 3 engage the spline teeth of the internally splined shaft 7, thereby forcing the externally splined shaft 3 to rotate. The rotation and displacement of the externally splined shaft 3 cause the spline shaft 4, which is attached to the valve stem of the ball valve, to rotate, thereby causing the valve stem to rotate. Rotation of the valve stem causes the ball valve to move from an open position to a closed position. In certain embodiments, a valve stem can be rotated a quarter turn in order to move from an open position to a closed position. FIG. 1 depicts the piston 2 in the position it will be in after the cavity 13 is emptied of fluid.

In the embodiment shown in FIGS. 1-4, the externally splined shaft 3 is guided by bearings 5, 6. The result is that the piston 2 is insulated from rotational forces exerted by the externally splined shaft 3. Likewise, the piston 2 and its sealings are subjected to axial force, but little to no rotational force. This has been found to be beneficial because known piston sealings are designed to withstand either axial force or rotational force, but not both. Providing an axial force but little to no rotational force to the piston 2 can result in less wear on the sealings of the piston 2, which can result in a longer lifespan for the actuator.

In the embodiment shown in FIGS. 1-4, the springs 9 exert a force on the spring cap 14 which translates the force to the joint member 8 which translates the force to the piston 2. This configuration has been found to be beneficial because it reduces the side loads created by the springs 9, thereby reducing the side loads and friction on the sealings of the piston 2. Reducing the side loads and friction on the sealings of the piston 2 can result in reduced wear on the sealings of the piston 2 and reduced possibility for fluid leaks, which can result in a longer lifespan for the actuator.

In the embodiment shown in FIGS. 1-4, the fluid is separated from the externally splined shaft 3, the splined shaft 4, and the internally splined shaft 7. This configuration has been found to be beneficial because it eliminates contamination that can be caused by operation of the shafts 3, 4, 7, which can include small particles coming from wear and friction of the splined shafts contacting each other. For example, after cycle tests of at least 1200 cycles using actuators of various sizes, it was found that the cleanliness level inside the fluid cavities of actuators built as described above did not degrade. This is a marked improvement over known actuators in which cleanliness levels are reduced after a relatively small number of cycles. Reducing contamination can result in reduced shut down periods due to maintenance required on a filtering unit of a power system and reduced possibility of damaging sealings of a piston.

It has also been found that separation of the axially displaceable piston from the rotatable splined shafts allows for customization of actuators using different hydraulic operating pressures, which can be desirable.

Figure 5:
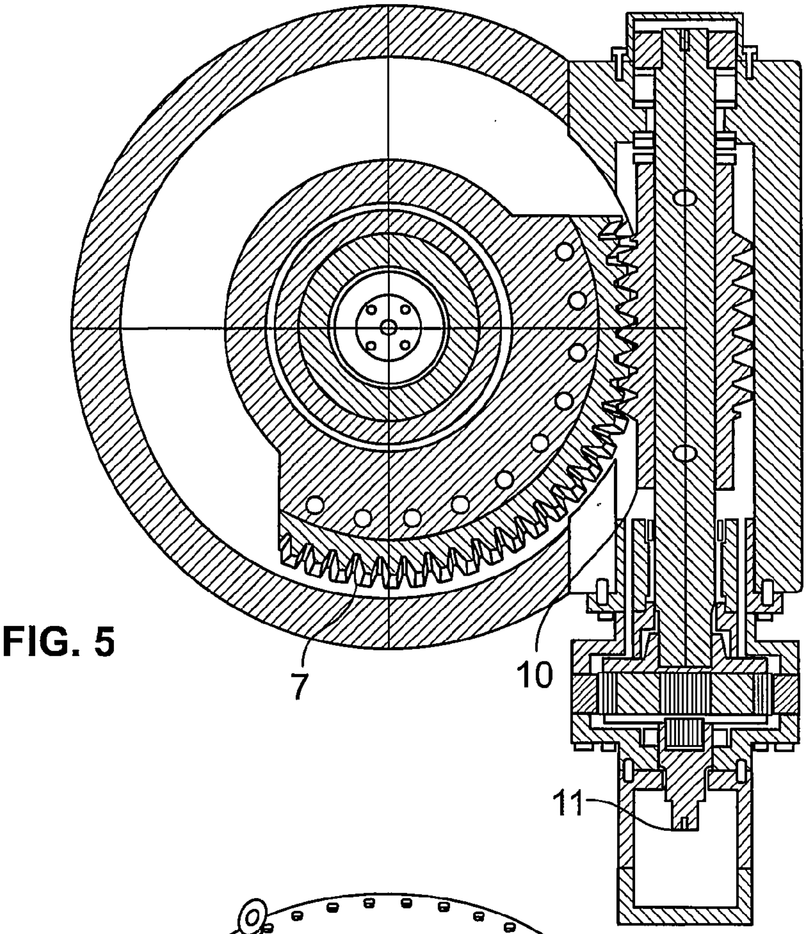
FIG. 5 is a top sectional view of an actuator used in accordance with an embodiment of the present technology.

FIG. 5 is a top sectional view of a ball valve with an actuator used in accordance with an embodiment of the present technology. In the embodiment shown in FIG. 5, the actuator includes a system for local operation by a remote operated vehicle or a diver with a portable torque tool, for example. The system includes an input shaft 11, a worm screw 10, and an internally splined shaft 7. Rotation of the input shaft 11 rotates the worm screw 10, thereby rotating the internally splined shaft 7. Rotation of the internally splined shaft 7 can cause rotation without axial displacement of an externally splined shaft 3, which causes rotation of a splined shaft 4 and a connected valve stem of a ball valve. In certain embodiments, rotating the valve stem of a ball valve a quarter turn in one direction can move the ball valve from an open position to a closed position. Likewise, in certain embodiments, rotating the valve stem of a ball valve a quarter turn in the opposite direction can move the ball valve from a closed position to an open position.

The actuator described in connection with FIG. 5 can actuate a ball valve without using a piston, a spring, or hydraulic pressure. Actuators that do not use hydraulic pressure can be used when a hydraulic power system is not available or not functioning, for example, due to a blockage of the hydraulic system. Further, it has been found that an actuator without a piston and a spring can be smaller and can weigh less than actuators with pistons and/or springs. Weight saving can be especially important for actuators installed on platforms or underwater structures because, in such instances, weight reduction can reduce the size of supporting structures with consequent cost reduction of the full structure.

Figure 6:
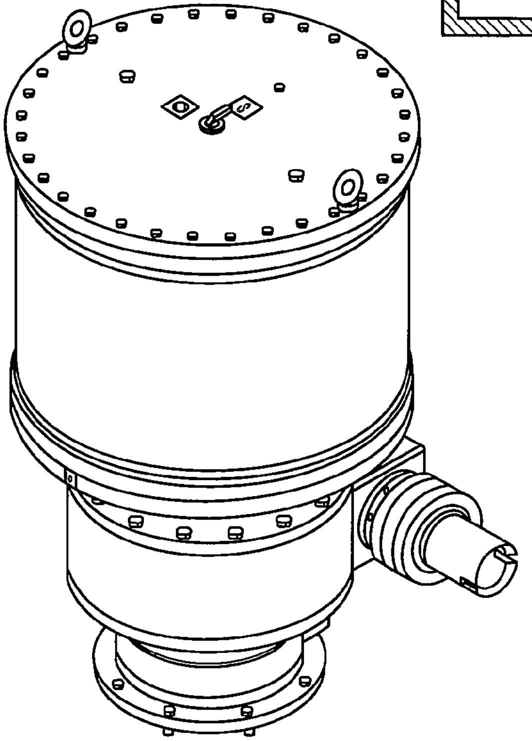
FIG. 6 is a perspective view of an actuator used in accordance with an embodiment of the present technology.

FIG. 6 is a perspective view of a ball valve used in accordance with an embodiment of the present technology.

Figure 7:
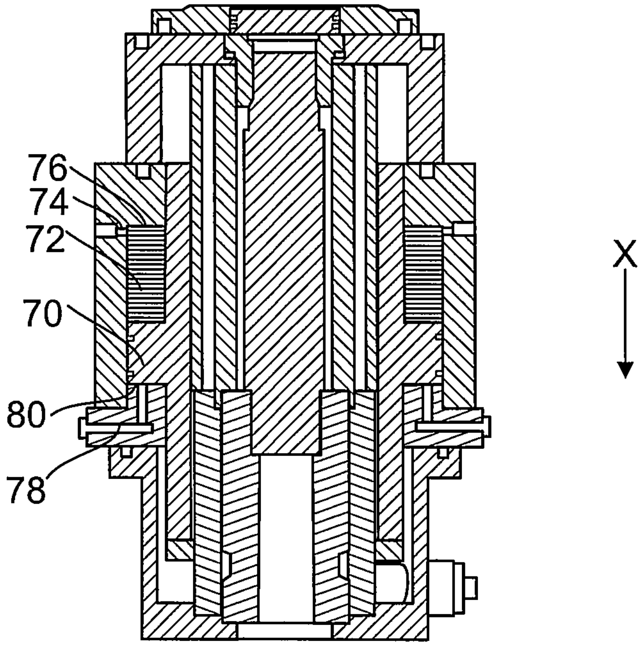
FIG. 7 is a side sectional view of an actuator used in accordance with an embodiment of the present technology.
Figure 8:
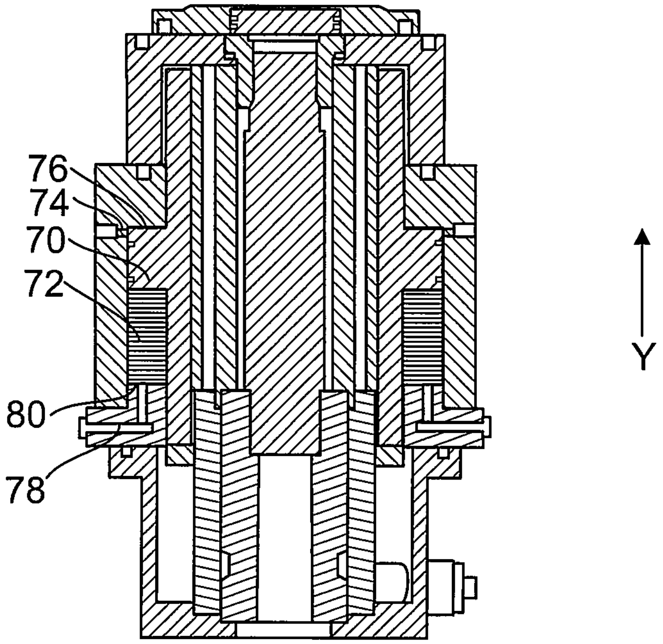
FIG. 8 is a side sectional view of the actuator of FIG. 7.

FIG. 7 is a side sectional view of an actuator used in accordance with an embodiment of the present technology. FIG. 8 is a side sectional view of the actuator of FIG. 7. The actuators shown in FIGS. 7 and 8 have a piston 70, a cavity 72, a first feed line 74 configured to supply fluid to a first end 76 of the cavity 72, and a second feed line 78 configured to supply fluid to a second end 80 of the cavity 72. In operation, when fluid is supplied to the first end 76 of the cavity 72, the fluid exerts a force on the piston 70 in a first axial direction x, thereby displacing the piston 70 in the first axial direction x. Further, when fluid is supplied to the second end 80 of the cavity 72, the fluid exerts a force on the piston 70 in a second axial direction y that is opposite of the first axial direction x, thereby displacing the piston 70 in the second axial direction y. As discussed above in connection with FIGS. 1-4, the piston can be used in connection with an externally splined shaft and an internally splined shaft to cause rotation of a valve stem of a ball valve.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. An actuator comprising:

(a) a piston at least partially disposed within a cavity, said piston displaceable axially and rotationally inhibited;

(b) a first feed conduit for directing a fluid to a first end of said cavity, said fluid capable of exerting force on said piston in a first axial direction, thereby displacing said piston in said first axial direction;

(c) a first shaft having helical spline teeth extending from an external surface thereof, said first shaft displaceable in said first axial direction when said piston is displaced in said first axial direction;

(d) a second tubular shaft having helical spline teeth extending from an interior surface thereof, said second shaft interiorly-extending helical spline teeth engageable with said first shaft exteriorly-extending helical spline teeth, whereby upon rotation of said second shaft in a first rotational direction, said first shaft is displaced in a first axial direction, and wherein upon rotation of said second shaft in a second rotational direction circumferentially opposed to said first rotational direction, said first shaft is displaced in a second axial direction axially opposed to said first axial direction; and (e) a third shaft extending from a remotely operated vehicle, said third shaft engageable with said second shaft such that upon rotation of said third shaft in a third rotational direction, said second shaft rotates in said first rotational direction, and wherein upon rotation of said third shaft in a fourth rotational direction circumferentially opposed to said third rotational direction, said second shaft rotates in said second rotational direction.

2. The actuator of claim 1, wherein said first shaft has valve stem of a ball valve operatively associated therewith, whereby rotation of said first shaft correspondingly rotates said valve stem, thereby actuating said ball valve.

3. The actuator of claim 1, wherein said first and second shafts are rotatable about a first axis and said third shaft is rotatable about a second axis perpendicular to said first axis.

4. The actuator of claim 1, wherein a worm screw operatively associated said third shaft rotates when said third shaft rotates.

* * * * *